June 4, 1946.   R. E. FRENCH   2,401,682
INDICATOR ASSEMBLY
Filed Sept. 1, 1942   2 Sheets-Sheet 1

Robert E. French
INVENTOR

BY
ATTORNEYS

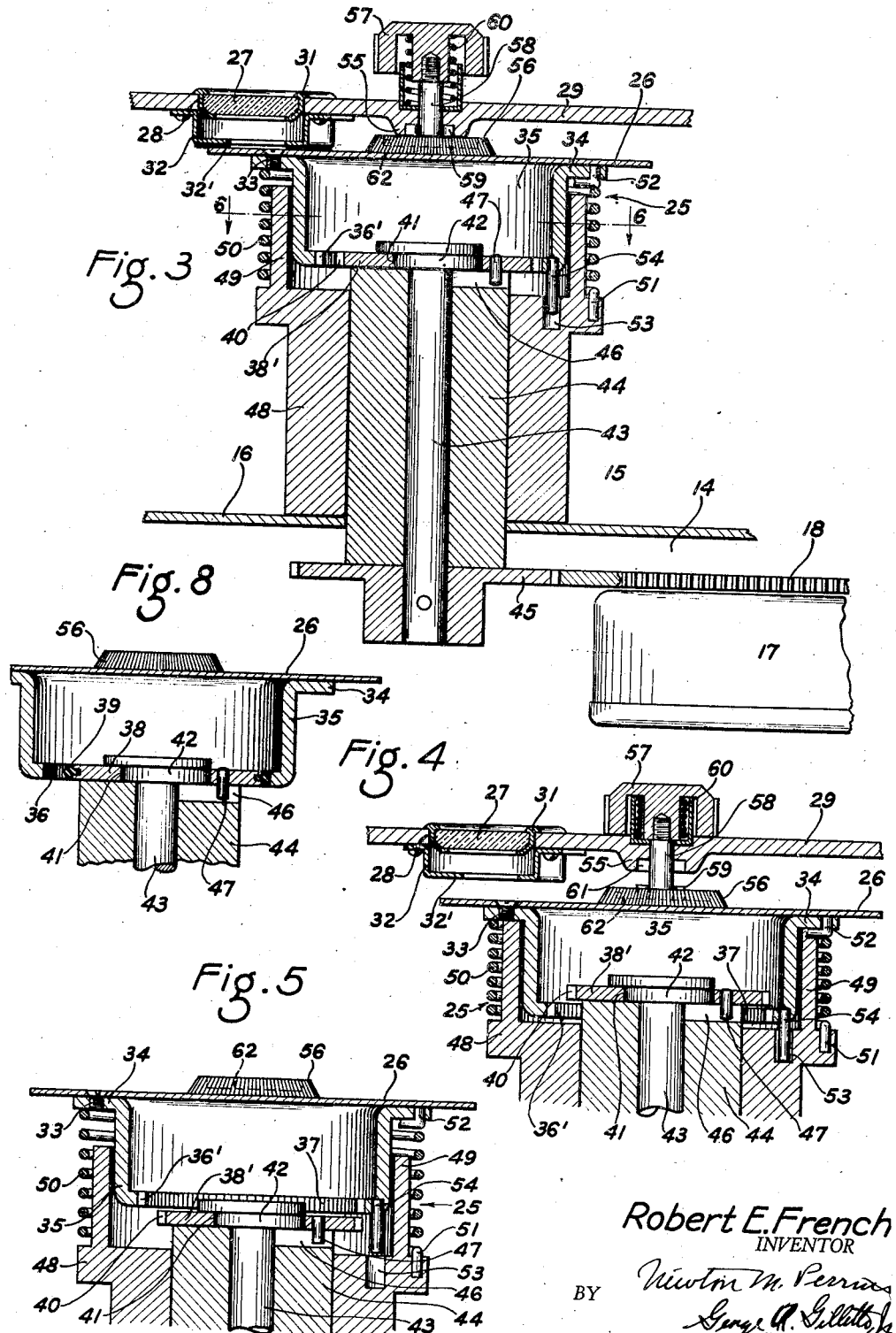

Patented June 4, 1946

2,401,682

UNITED STATES PATENT OFFICE 2,401,682

INDICATOR ASSEMBLY

Robert E. French, Rochester, N. Y., assignor to Eastman Kodak Company, Rochester, N. Y., a corporation of New Jersey Application September 1, 1942, Serial No. 456,951

7 Claims. (Cl. 235—103)

This invention relates to film handling apparatus and more particularly to a footage indicator for such apparatus.

Footage indicators used in conjunction with cameras and many other types of winding and reeling devices necessitate a large reduction in movement with respect to the movement of the film or web. In the usual type of footage indicator which is gear driven, the desired reduction is obtained by a conventional train of gears which connect the prime mover of the film or web with the footage indicator. This type of indicator, if it is in a remote position with respect to the prime mover of the film or web, necessitates a large number of parts and gears to form the connection therebetween. Other types of indicators which utilize a system of levers are usually operated from the periphery of the take-up or supply roll. As a result, the indicator is limited to showing only an approximate amount of film which has been wound up or exposed or which still remains on the reel. Further, if the film or web is loosely wound on the reel, a certain amount of error is introduced which is not accounted for by the indicator.

The primary object of the present invention is to provide a footage indicator in which the ratio of the movement of the counter or indicating disc to the film movement is very small.

A further object of the invention is to provide a film footage indicator in which the desired reduction may be obtained with a minimum number of parts.

Another object of the invention is to provide a film footage indicator driven directly from the power source for moving the film.

A still further object of the invention is to provide a footage indicator which is operable only when the cover for the casing in which it is housed is in its closed position.

And yet another object of the invention is to provide a film footage indicator that may be set to any predetermined position when the cover is in its closed position.

Another object of the invention is to provide a film footage indicator that automatically returns to its zero position when the cover is removed.

And yet another object of the invention is to provide a film footage indicator that comprises relatively few parts, is inexpensive to manufacture, and highly efficient in operation.

Further objects and advantages will be suggested to those skilled in the art by the description which follows.

The above objects and advantages are embodied and shown in a movie camera but may be utilized in many types of film handling apparatus where a large reduction in the movement of the counter means with respect to the film movement is necessary. Such film handling apparatus comprises a casing containing a counter disc which is connected to a driven member having an internal gear formed therein and which is driven by a pinion within the internal gear, said pinion being confined to an oscillatory movement by a pin and slot. An eccentric, which is directly connected to the prime mover of the film, oscillates the pinion so that the pinion successively engages portions of the internal gear to move it and the counter disc beneath a window in the cover.

Reference is hereby made to the accompanying drawings wherein like reference characters designate similar parts and wherein:

Fig. 3 is a vertical section, taken substantially on the line 3—3 of Fig. 2, showing the various parts in their operating relationship with the cover in its closed position;

Fig. 4 is a partial view similar to Fig. 3 showing the counter mechanism in an inoperative condition and capable of being set to a predetermined position;

Fig. 5 is a partial view similar to Fig. 3 showing the various parts in their inoperative position when the cover has been removed;

Fig. 8 is a partial section showing a modified form of the invention.

Figure 1:
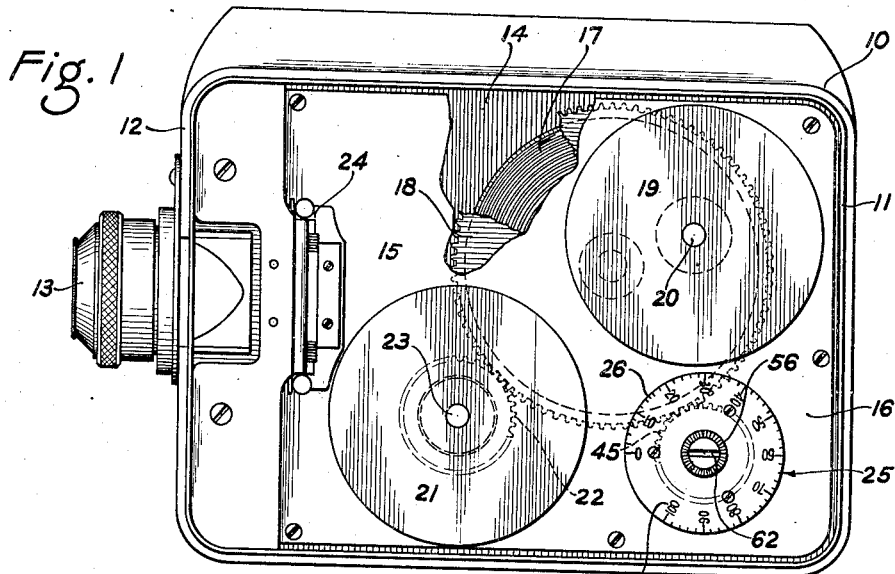
Fig. 1 is a side elevation of a conventional movie camera with the cover for the casing removed.

In the present invention, the necessary reduction in movement of the footage indicator with respect to the movement of the film or web is obtained by the use of three gears instead of a conventional train of gears or systems of levers. The footage indicator is connected directly to the prime mover of the film or web thereby utilizing a minimum number of parts. By connecting the footage indicator directly to the prime mover, the exact amount of film or web wound up or exposed or remaining on the reel is indicated, and any error resulting from a loosely wound roll is entirely discounted. Also, the present invention lends itself very readily to novel features that are not particularly adapted to other types of footage indicators.

In the illustrated embodiment of the invention, the camera 10 has a casing 11 having on the front wall 12 thereof an objective 13. The camera 10 is divided into a mechanism chamber 14 and a film chamber 15 by the plate 16. The spring motor 17 is mounted in the mechanism chamber 14 and is of the conventional type which drives a master gear 18 from which the pulldown and other mechanism, not shown, are operated. The film chamber 15 has mounted therein, the supply reel 19 which is loosely mounted on the stud 20 and the takeup reel 21 which may be driven from the gear 18 by the gear 22 mounted on the end of the stud 23. It is to be understood, of course, that the film from the supply reel 19 passes over the conventional sprockets, which are not shown, and through the gate 24 and then to the take-up reel 21 in the usual manner.

Figure 2:
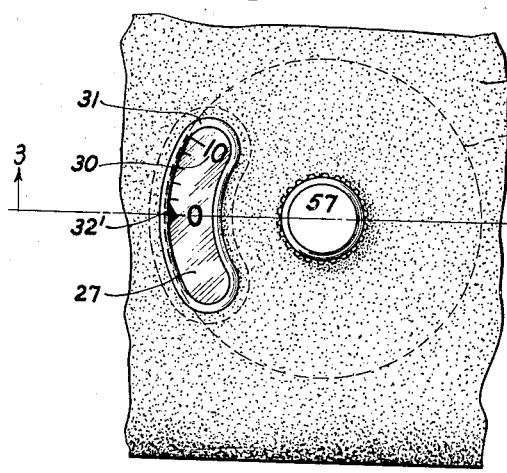
Fig. 2 is a partial side elevation showing the window through which the counter disc is viewed.

The footage indicator, broadly designated by the numeral 25, is mounted in the film chamber 15 and a portion of the counter disc 26 is visible through the glass plate 27 which is mounted in the holder or frame 31 mounted in the arcuate aperture 28 in the cover 29, as clearly shown in Figs. 2 and 3. The counter disc 26 is provided with a suitable footage scale 30, and the light shield 32 is provided with an index 32' which is visible through the plate 27, as indicated in Fig. 2.

Figure 6:
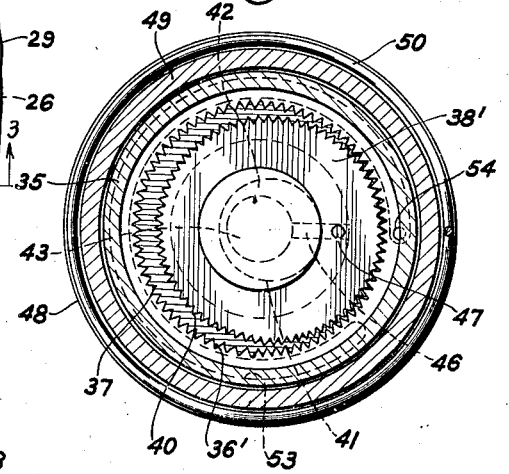
Fig. 6 is a section taken on the line 6—6 of Fig. 3 showing the relationship of the pinion to the internal gear and the drive member.
Figure 7:
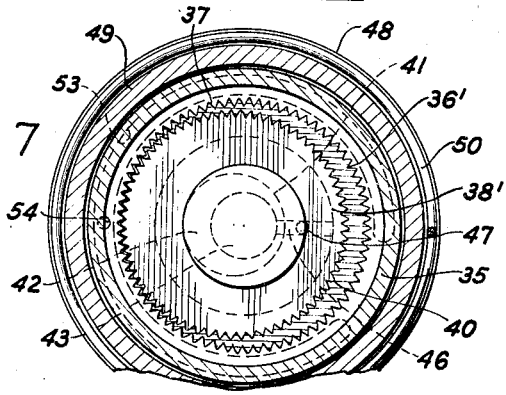
Fig. 7 is a view similar to Fig. 6 showing the position of the pinion after the internal gear has been moved through one-half a revolution.

The counter disc 26 is connected by the screws 33 to the flange 34 of the driven member 35 which is provided with an internal annular surface 36. The annular surface 36 may be smooth, as indicated in Fig. 8, or it may be provided with serrations or teeth 37 to form an internal gear 36'. A drive member 38, which may take the form of a rubber rimmed roller 39, as shown in Fig. 8, or a pinion 38' with serrations or teeth 40, as shown in Figs. 6 and 7, is positioned within the internal gear so that the surfaces or teeth are in engagement to form a driving connection therebetween.

The pinion 38' is provided with a concentric aperture 41 in which is positioned an eccentric drive member 42. The eccentric drive member is on the shaft 43 which is mounted in the support member 44. A gear 45 is mounted on the shaft 43 and meshes with and is driven by the gear 18 connected to the motor 17. The support member 44 is provided with a slot 46 for the pin 47 carried by the pinion 38' for the purpose to be described hereinafter. The support member 44 is mounted in the bearing 48 which is provided with a flanged portion 49 in which the driven member 38 is suspended by the coil spring 50.

The coil spring 50 has one end 51 fixed to the bearing 48 and the other end 52 anchored in the flange 34 of the driven member 35. The spring 50 has a threefold purpose, namely; maintaining the internal gear 36' and the pinion 38' in engagement when the cover 29 is in position, returning the counter disc 26 to its zero position when the cover 29 is removed, and allowing movement of the counter disc 26 and driven member 35 in either direction with respect to the pinion 38'.

In order to obtain the necessary reduction in the above described footage indicator, the drive member 38 is made smaller in diameter than the diameter of the annular surface 36. As shown in the preferred embodiment, the pinion 38' has fewer teeth than the internal gear 36' and making the pitch of the teeth 40 larger than that of the teeth 36 provides a smoother action with less tendency for the teeth to bind. The pinion 38' is given an oscillatory movement by the eccentric drive member 42 but is prevented from turning by the pin 47 which engages the slot 46. As the eccentric drive member 42 is rotated by the gear 45 which is driven by the gear 18 connected to the motor 17, the pinion 38' is oscillated so that the teeth 40 successively engage the teeth 37 and rotate the driven member 35 and the counter disc 26 and at the same time wind up the spring 50 connected thereto. The movement of the pinion 38' is confined by the pin 47 and the slot 46 to an oscillatory motion and, as will be noted from an inspection of Figs. 6 and 7, only a portion of the teeth 40 and 37 are in engagement at any one time. This manner of engagement and movement of the pinion 38' imparts a much reduced rotary motion to the driven member 35 and thence to the counter disc 26 with a minimum number of parts. The movement of the counter disc 26 is limited by the slot 53 in the bearing 48 and the pin 54 carried by the driven member 35.

The cover 29, as shown in Figs. 3 and 4, has a boss 55 thereon which is adapted to engage a boss 56 on the counter disc 26 so that when the cover 29 is in its closed position, the driven member 35 compresses the spring 50 to such a position that the internal gear 36' and pinion 38' are in engagement. As the driven member 35 and the counter disc 26 are moved in a counter-clockwise direction, the spring 50 is wound tightly around the flange 49, and when the cover 29 is removed from the casing 11, the spring 50 will expand thereby disengaging the internal gear 36' and the pinion 38', as shown in Fig. 5, and then unwind to reverse the movement of the counter disc 26 until the pin 54 strikes the end of the slot 53, as shown in Fig. 6, which is the zero position.

In order to set the counter disc to any predetermined position, a knob 57 is rotatably mounted on the cover 29 and provided with a portion or extension 58 which has lugs 59 formed thereon. The knob 57 is held in an extended position from the cover 29 by the spring 60 which also draws the lugs 59 into a recess 61 in the boss 55. The boss 56 on the counter disc 26 is provided with a slot 62, as shown in Fig. 1, to receive the lugs 59 for turning the counter disc 26. To turn the counter disc 26, the knob 57 is moved inwardly and given a sligh turn until the lugs 59 engage the slot 60, further movement of the knob 57 is necessary in order to compress the spring 50 so the internal gear 36' and the pinion 38' are disengaged, as shown in Fig. 4. The counter disc 26 can then be turned to any position and upon releasing the knob 57, the spring 50 will return the gears to their engaging relationship and the spring 60 will return the knob 57 to its extended position.

It will be noted that the internal gear 36' and the pinion 38' when in their engaging position are locked against movement due to the geared drive to the motor 17. This locking action prevents any accidental movement of the counter disc.

It is obvious that other mechanical arrangements may be used or provided and the film handling apparatus disclosed herein is merely illustrative.

Having now particularly described my invention, what I desire to secure by Letters Patent of the United States and what I claim is:

1. In a device of the character described, the combination with a support member, an indicating member having a graduated scale and mounted for rotation with respect to an index mark and for axial movement, a driving member for engaging and rotating said indicating member, and a spring member attached to said support member and also to said indicating member and constructed and arranged to move said indicating member axially in one direction, permit axial movement in the other direction for disengagement from said driving member and, after said axial movement in said one direction, simultaneously to rotate said indicating member to a predetermined position.

2. In a device of the character described, the combination with a casing, a support member therein, and a cover movable to open and closed positions with respect to said casing, of an indicating member including a graduated disk and mounted for rotational and axial movement, a driving member for engaging and rotating said indicating member, and a spring member attached to said support member and to said indicating member, for moving said indicating member axially for disengagement from said driving member and for returning said indicating member to a predetermined position when said cover is in open position.

3. In a device of the character described, the combination with a casing, a support member therein, and a cover movable to open and closed positions with respect to said casing, of an indicating member including a graduated disk and mounted for rotational and axial movement, a driving member for engaging and rotating said indicating member, and a spring member attached to said support member and to said indicating member, adapted when said cover is in closed position to be compressed and to hold said indicating means in position for engagement by said driving member, and for moving said indicating member axially for disengagement from said driving member when said cover is in open position.

4. In a device of the character described, the combination with a casing, a support member therein, a cover movable to open and closed positions with respect to said casing, and a setting member mounted in said cover for axial movement, of an indicating member including a graduated disk and mounted for axial movement to an intermediate and two extreme positions, a driving member for actuating said indicating member only when the same is in its intermediate position, and a spring member operatively connected to said support member and to said indicating member, adapted to move said indicating member to one extreme position when said cover is opened, and adapted when said cover is closed to be compressed for movement of said indicating member to its other extreme position by axial movement of said setting member.

5. In a device of the character described, the combination with a casing, a support member therein, a cover movable to open and closed positions with respect to said casing, and a setting member mounted in said cover for rotational and axial movement, of an indicating member rotatably mounted and axially movable to an intermediate and two extreme positions, a driving member for actuating said indicating member only when the same abuts said cover and is in its intermediate position, and a spring member operatively connected to said support member and to said indicating member and constructed and arranged to move said indicating member to one extreme position when said cover is open and to allow displacement of said indicating means to its other extreme position by axial movement of said setting member on the cover.

6. In a device of the character described, the combination with a casing, a support member therein, and a cover movable to open and closed positions with respect to said casing, of an indicating member including a graduated disk and mounted for rotational and axial movement, a driving member for engaging and rotating said indicating member, and a coil spring member attached to said support member and to said indicating member, adapted, when said cover is in closed position, to hold said indicating means against said cover in position for engagement by said driving member and to be tensioned by rotation of said indicating means by said driving member, and adapted, when said cover is opened, to move said indicating member axially for disengagement from said driving member and then rotatably for return to a predetermined position.

7. In a device of the character described, the combination with a casing, a support member therein and having an annular portion, a cover movable to open and closed positions with respect to said casing and provided with a window and index mark, of an indicating member including a graduated disk and a cylindrical body having an annluar surface, a driving member rotatably mounted in said support member and for engaging said annular surface to rotate said indicating member, and a coil spring encircling the annular portion of said support member, having one end anchored therein and having its other end connected to said indicating member, for supporting the latter for rotation within said annular portion, adapted when said cover is in closed position to be compressed axially so that said indicating member is engaged by said driving member and adapted when said cover is opened to move said indicating member axially for disengagement from said driving member and to rotate said driving member to return the same to a predetermined position.

ROBERT E. FRENCH.